(12) United States Patent
Seo et al.

(10) Patent No.: US 9,264,915 B2
(45) Date of Patent: Feb. 16, 2016

(54) METHOD AND DEVICE FOR SETTING CHANNEL STATUS INFORMATION MEASURING RESOURCE IN A WIRELESS COMMUNICATION SYSTEM

(75) Inventors: Hanbyul Seo, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 13/979,303

(22) PCT Filed: Jan. 12, 2012

(86) PCT No.: PCT/KR2012/000303
§ 371 (c)(1),
(2), (4) Date: Jul. 11, 2013

(87) PCT Pub. No.: WO2012/096532
PCT Pub. Date: Jul. 19, 2012

(65) Prior Publication Data
US 2013/0301465 A1    Nov. 14, 2013

Related U.S. Application Data

(60) Provisional application No. 61/432,596, filed on Jan. 14, 2011, provisional application No. 61/505,090, filed on Jul. 6, 2011, provisional application No. 61/524,741, filed on Aug. 17, 2011.

(51) Int. Cl.
| H04W 24/00 | (2009.01) |
| H04B 7/06 | (2006.01) |
| H04L 25/02 | (2006.01) |
| H04B 17/345 | (2015.01) |
| H04L 5/00 | (2006.01) |

(52) U.S. Cl.
CPC ............. *H04W 24/00* (2013.01); *H04B 7/0626* (2013.01); *H04B 17/345* (2015.01); *H04L 25/0202* (2013.01); *H04L 5/0023* (2013.01); *H04L 5/0048* (2013.01)

(58) Field of Classification Search
None
See application file for complete search history.

(56) References Cited

U.S. PATENT DOCUMENTS

| 7,120,431 | B1* | 10/2006 | Huo | H01Q 1/246 455/423 |
| 8,009,574 | B2* | 8/2011 | Schenk | H04W 52/22 370/201 |
| 8,717,969 | B2* | 5/2014 | Lee | H04L 5/1469 370/252 |
| 2004/0229570 | A1* | 11/2004 | Matsumura | H04L 25/0262 455/67.11 |
| 2007/0105583 | A1* | 5/2007 | Gerlach | H04W 16/04 455/522 |

(Continued)

OTHER PUBLICATIONS

Huawei, et al., "Signaling and UE Behaviors for Resource-Specific CSI Measurements," 3GPP TSG RAN WG1 meeting #63, R1-105852, Nov. 2010, 4 pages.

(Continued)

*Primary Examiner* — Jeffrey M Rutkowski
*Assistant Examiner* — Jonathan B Wood
(74) *Attorney, Agent, or Firm* — Lee, Hong, Degerman, Kang & Waimey

(57) ABSTRACT

The present invention relates to a wireless communication system, and more specifically, discloses a method and a device for setting a channel status information (CSI) measuring resource in a wireless communication system. The present invention provides a way to transmit/receive the CSI more accurately and efficiently by setting a virtual reference resource for measuring the CSI.

11 Claims, 10 Drawing Sheets

(56) References Cited

U.S. PATENT DOCUMENTS

| | | | |
|---|---|---|---|
| 2010/0054137 A1* | 3/2010 | Deng | H04B 7/15592 370/247 |
| 2011/0009157 A1* | 1/2011 | Osterling | H04L 1/0001 455/522 |
| 2011/0085519 A1* | 4/2011 | Koivisto | H04J 13/00 370/335 |
| 2011/0141987 A1* | 6/2011 | Nam | H04L 1/0003 370/329 |
| 2011/0176517 A1* | 7/2011 | Hu | H04L 5/0026 370/335 |
| 2011/0188481 A1* | 8/2011 | Damnjanovic | H04W 72/04 370/336 |
| 2011/0305293 A1* | 12/2011 | Choi | H04W 72/082 375/285 |
| 2011/0317581 A1* | 12/2011 | Hoshino | H04L 1/0026 370/252 |
| 2012/0071102 A1* | 3/2012 | Palomar | H04W 16/14 455/63.1 |
| 2012/0082049 A1* | 4/2012 | Chen | H04W 24/10 370/252 |
| 2012/0087321 A1* | 4/2012 | Han | H04L 5/005 370/329 |
| 2012/0108239 A1* | 5/2012 | Damnjanovic | H04L 5/0073 455/436 |
| 2012/0113844 A1* | 5/2012 | Krishnamurthy | H04L 1/0026 370/252 |
| 2012/0120846 A1* | 5/2012 | Hwang | H04W 24/10 370/254 |
| 2012/0147810 A1* | 6/2012 | Wang | H04W 24/02 370/315 |
| 2012/0155314 A1* | 6/2012 | Miyata | H04W 72/048 370/252 |
| 2012/0176924 A1* | 7/2012 | Wu | H04W 72/0406 370/252 |
| 2012/0176925 A1* | 7/2012 | Hwang | H04W 24/10 370/252 |
| 2012/0307660 A1* | 12/2012 | Lindoff | H04W 24/10 370/252 |
| 2013/0003646 A1* | 1/2013 | Michel | H04B 7/15592 370/315 |
| 2013/0064129 A1* | 3/2013 | Koivisto | H04B 7/0636 370/252 |
| 2013/0070732 A1* | 3/2013 | Noh | H04L 5/0016 370/335 |
| 2013/0107743 A1* | 5/2013 | Ishii | H04L 5/001 370/252 |
| 2013/0208677 A1* | 8/2013 | Lee | H04L 5/0094 370/329 |
| 2013/0208689 A1* | 8/2013 | Kim | H04L 5/001 370/329 |
| 2013/0223258 A1* | 8/2013 | Seo | H04W 24/02 370/252 |
| 2013/0235811 A1* | 9/2013 | Li | H04B 7/0452 370/329 |
| 2013/0260793 A1* | 10/2013 | Lim | G01S 5/10 455/456.1 |
| 2014/0003269 A1* | 1/2014 | Golitschek Edler von Elbwart | H04L 5/003 370/252 |
| 2014/0169202 A1* | 6/2014 | Chung | H04L 5/0048 370/252 |
| 2014/0364113 A1* | 12/2014 | Kang | H04B 7/061 455/422.1 |

OTHER PUBLICATIONS

NTT Docomo, "Remaining issues on eICIC for Rel-10," 3GPP TSG RAN WG1 Meeting #63, R1-106184, Nov. 2010, 6 pages.

Nokia Siemens Networks, et al., "Details of restricted CSI measurements," 3GPP TSG RAN WG1 Meeting #63, R1-106217, Nov. 2010, 2 pages.

Qualcomm Inc., "CSI measurement reference," 3GPP TSG-RAN WG1 Meeting #63, R1-106361, Nov. 2010, 8 pages.

3rd Generation Partnership Project (3GPP), "Technical Specification Group Radio Access Network; Evolved Universal Terrestrial Radio Access (E-UTRA); Physical layer procedures (Release 10)," 3GPP TS 36.213 V10.0.1, Dec. 2010, 98 pages (relevant sections: section 7.2).

PCT International Application No. PCT/KR2012/000303, Written Opinion of the International Searching Authority dated Jul. 31, 2012, 16 pages.

* cited by examiner

FIG. 5
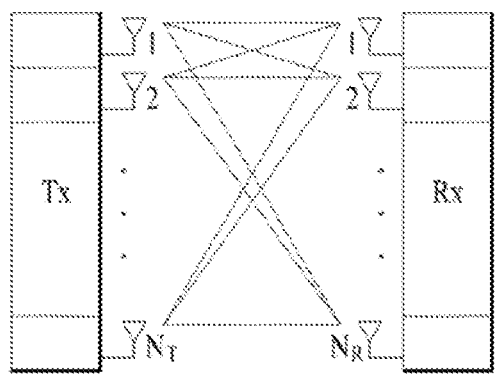
(a)
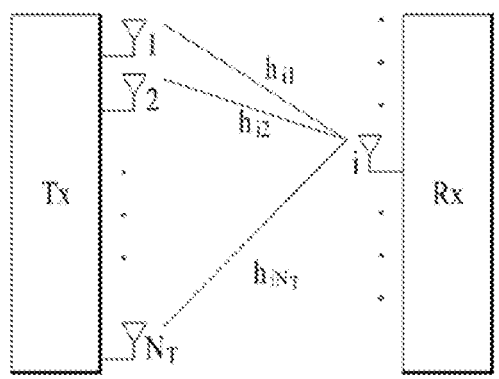
(b)

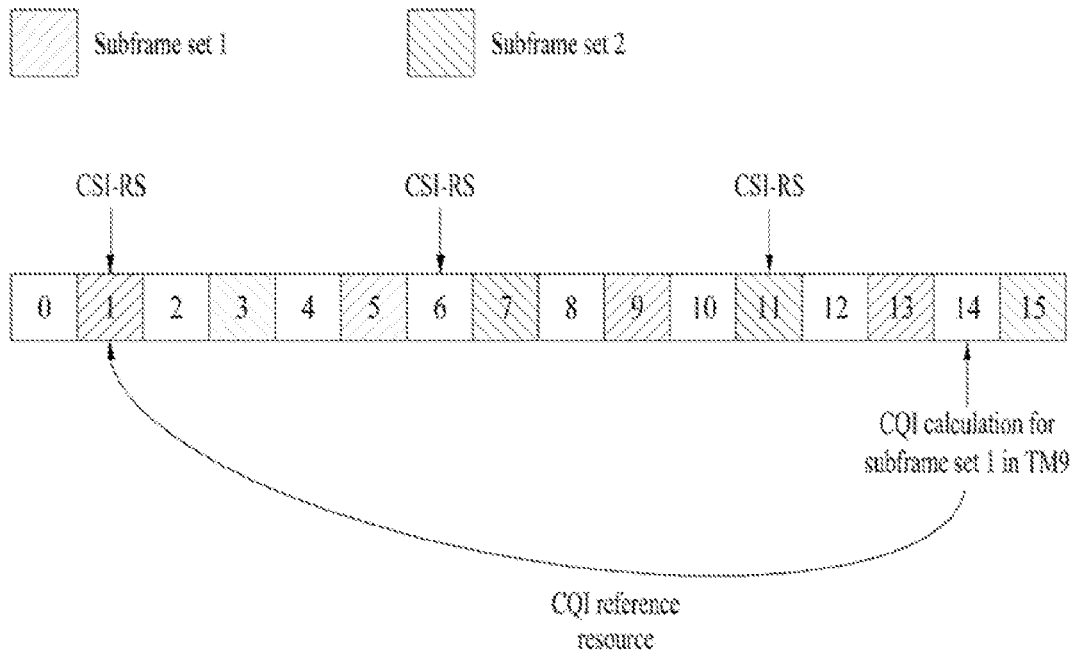
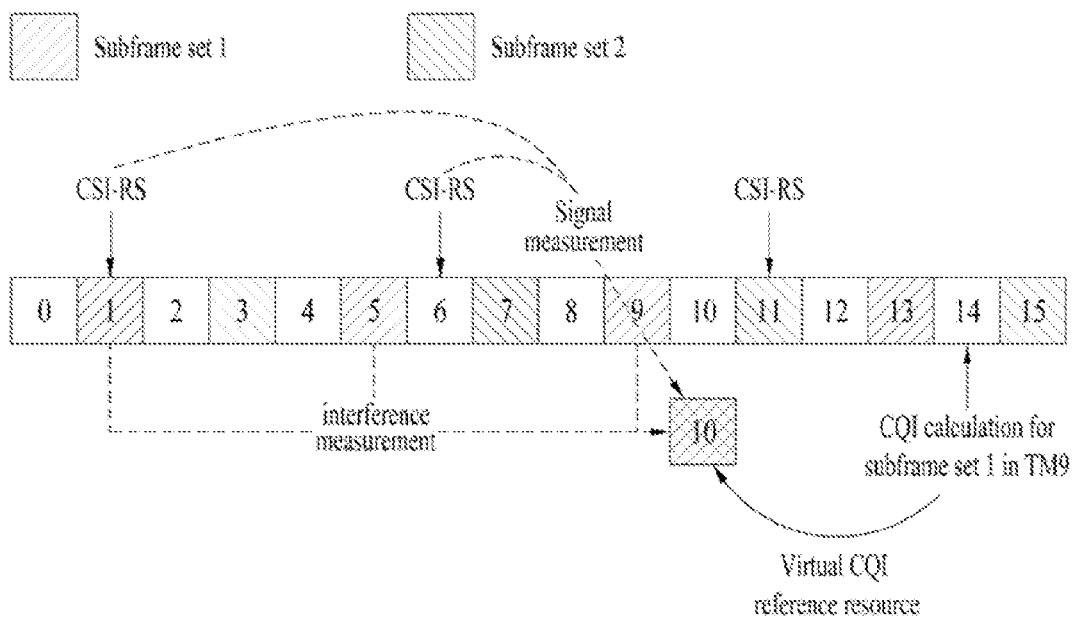

METHOD AND DEVICE FOR SETTING CHANNEL STATUS INFORMATION MEASURING RESOURCE IN A WIRELESS COMMUNICATION SYSTEM

CROSS-REFERENCE TO RELATED APPLICATIONS

This application is the National Stage filing under 35 U.S.C. 371 of International Application No. PCT/KR2012/000303, filed on Jan. 12, 2012, which claims the benefit of U.S. Provisional Application Ser. No. 61/432,596, filed on Jan. 14, 2011, U.S. Provisional Application Ser. No. 61/505,090, filed on Jul. 6, 2011, and U.S. Provisional Application Ser. No. 61/524,741, filed on Aug. 17, 2011, the contents of which are all hereby incorporated by reference herein in their entirety.

TECHNICAL FIELD

The present invention relates to a wireless communication system, and more specifically, to a method and device for setting a channel status information measurement resource in a wireless communication system.

BACKGROUND ART

Multiple Input Multiple Output (MIMO) increases the efficiency of data transmission and reception using multiple transmit antennas and multiple receive antennas. A receiver receives data through multiple paths when multiple antennas are used, whereas the receiver receives data through a single antenna path when a single antenna is used. Accordingly, MIMO can increase data transmission rate and throughput while also improving coverage.

To increase multiplexing gain of MIMO, channel status information (CSI) can be fed back from a MIMO receiver to be used at a MIMO transmitter. The receiver can determine the CSI by performing channel measurement using a predetermined reference signal (RS) from the transmitter.

DISCLOSURE

Technical Problem

Subframes in which downlink channel measurement is performed are not limited in a conventional wireless communication system because a downlink channel is measured using a cell-specific reference signal (CRS) transmitted per subframe. In an advanced wireless communication system, however, a reference signal (i.e. CSI-RS) used for CSI measurement is not transmitted per subframe and it cannot be assumed that an interference level of a neighboring cell is identical in subframes when introduction of multi-cell operation or a heterogeneous network is considered. Accordingly, when a CSI measurement subframe is determined in the same manner as in the legacy system, an accurate CSI measurement result is not obtained and thus network throughput is reduced.

An object of the present invention devised to solve the problem lies in a method of setting a CSI measurement resource.

The technical problems solved by the present invention are not limited to the above technical problems and those skilled in the art may understand other technical problems from the following description.

Technical Solution

The object of the present invention can be achieved by providing a method for transmitting channel status information (CSI) by a UE in a wireless communication system, including: determining signal characteristics and interference characteristics in a reference resource for calculation of the CSI; and determining the CSI using the determined signal characteristics and interference characteristics and transmitting the CSI in a subframe n to an eNB. The reference resource is present in a subframe n−k (k≥4), the signal characteristics are determined from a signal measurement result through the reference resource or a previously received reference signal, and the interference characteristics are determined from a result of interference measurement in the reference resource or a previously set interference measurement resource.

In another aspect of the present invention, provided herein is a method for receiving CSI at an eNB in a wireless communication system, including: transmitting a reference signal to a UE; and receiving the CSI from the UE in a subframe n. The CSI is determined based on signal characteristics and interference characteristics in a reference resource present in a subframe n−k (k≥4), the signal characteristics being determined from a signal measurement result through the reference resource or a previously received reference signal, the interference characteristics being determined from a result of interference measurement in the reference resource or a previously set interference measurement resource.

In another aspect of the present invention, provided herein is a UE configured to transmit CSI in a wireless communication system, including: a reception module for receiving a downlink signal from an eNB; a transmission module for transmitting an uplink signal to the eNB; and a processor for controlling the UE including the reception module and the transmission module, wherein the processor is configured to determine signal characteristics and interference characteristics in a reference resource for calculation of the CSI, to determine the CSI using the determined signal characteristics and interference characteristics and to transmit the CSI to the eNB in a subframe n via the transmission module. The reference resource is present in a subframe n−k (k≥4), the signal characteristics are determined from a signal measurement result through the reference resource or a previously received reference signal, and the interference characteristics are determined from a result of interference measurement in the reference resource or a previously set interference measurement resource.

In another aspect of the present invention, provided herein is an eNB configured to receive CSI in a wireless communication system, including: a reception module for receiving an uplink signal from a UE; a transmission module for transmitting a downlink signal to the UE; and a processor for controlling the eNB including the reception module and the transmission module, wherein the processor is configured to transmit a reference signal to the UE through the transmission module and to receive the CSI from the UE in a subframe n through the reception module. The CSI is determined based on signal characteristics and interference characteristics in a reference resource present in a subframe n−k (k≥4), the signal characteristics being determined from a signal measurement result through the reference resource or a previously received reference signal, the interference characteristics being determined from a result of interference measurement in the reference resource or a previously set interference measurement resource.

The following is commonly applicable to the above-described embodiments of the present invention.

The subframe n−k to which the reference resource is set may include a valid downlink subframe or an invalid downlink subframe. The valid downlink subframe may be set for the UE, may not multicast/broadcast over a single frequency network (MBSFN) subframe in transmission modes other than a transmission mode for downlink transmission of a maximum of 8 layers, may not include a downlink pilot time slot (DwPTS) field less than a predetermined length and may not belong to a measurement gap set for the UE.

The reference signal upon which signal measurement is performed may correspond to a CSI-RS in the case of downlink transmission of up to 8 layers and correspond to a cell-specific RS in other cases.

When the CSI is periodically transmitted, the interference measurement resource may be set by a higher layer signal.

When the CSI is aperiodically transmitted, the interference measurement resource may be set by a predetermined indicator, the predetermined indicator being included in downlink control information including an indicator requesting transmission of the CSI.

When an interference measurement resource subframe set is configured for the UE and the CSI is aperiodically transmitted, the interference measurement resource may be included in a subframe belonging to the interference measurement resource subframe set configured for the UE and having a value k corresponding to a minimum value, from among a subframe in which the indicator requesting transmission of the CSI is transmitted and previous subframes.

When the CSI is aperiodically transmitted, the subframe in which the indicator requesting transmission of the CSI is transmitted may correspond to a subframe set to the interference measurement resource.

The reference measurement resource may be set to one or more resource elements (REs) having zero transmit power.

The interference measurement resource may be set to CSI-RS REs.

Plural interference measurement resource sets may be configured in a subframe for the UE, wherein a subframe set in which the interference measurement resource is present and a subframe set to which interference characteristics represented by the interference measurement resource are applied are separately set for each of the plural interference measurement resource sets.

The signal characteristics may correspond to the signal measurement result through the reference signal or may be determined as a value estimated from the signal measurement result, and the interference characteristics may correspond to the result of interference measurement in the interference measurement resource or may be determined as a value estimated from the interference measurement result.

The result of interference measurement in the interference measurement resource may represent interference characteristics in a subframe corresponding to the reference resource.

The above description and the following detailed description of the present invention are exemplary and are for the purpose of additional explanation of the claims.

Advantageous Effects

According to the present invention, it is possible to provide a method of setting a CSI measurement resource and a method of measuring and/or calculating accurate CSI.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a configuration of a wireless communication system having multiple antennas;
FIG. 7 illustrates an example of setting a CQI reference resource;
FIG. 8 illustrates an example of setting a virtual CQI reference resource.

BEST MODE

Figure 1:
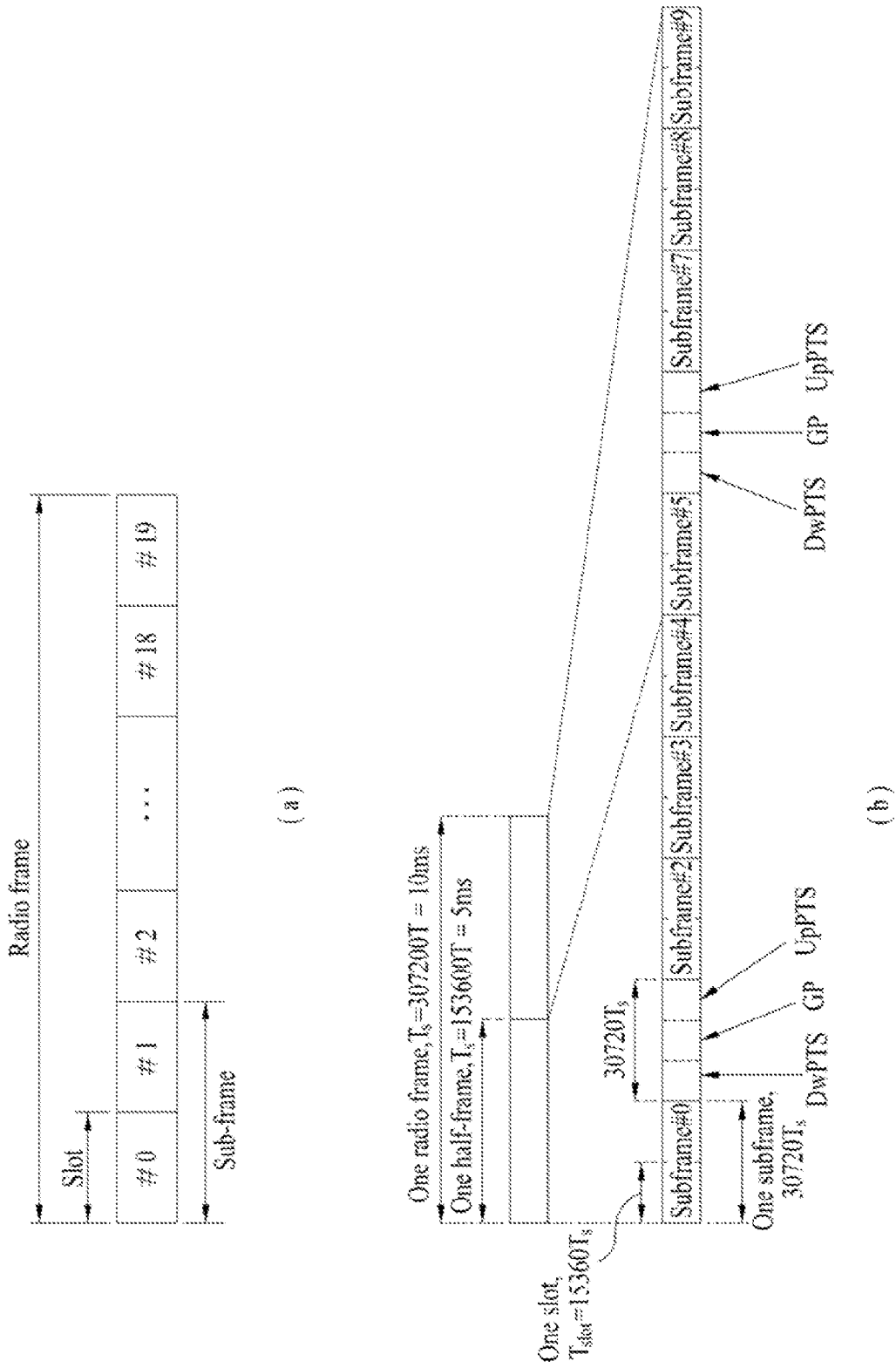
FIG. 1 illustrates a downlink radio frame structure.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

A downlink radio frame structure will now be described with reference to FIG. 1.

In a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 1(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The aforementioned radio frame structure is purely exemplary and thus the number of subframes included in a radio frame, the number of slots included in a subframe, or the number of symbols included in a slot may vary.

Figure 2:
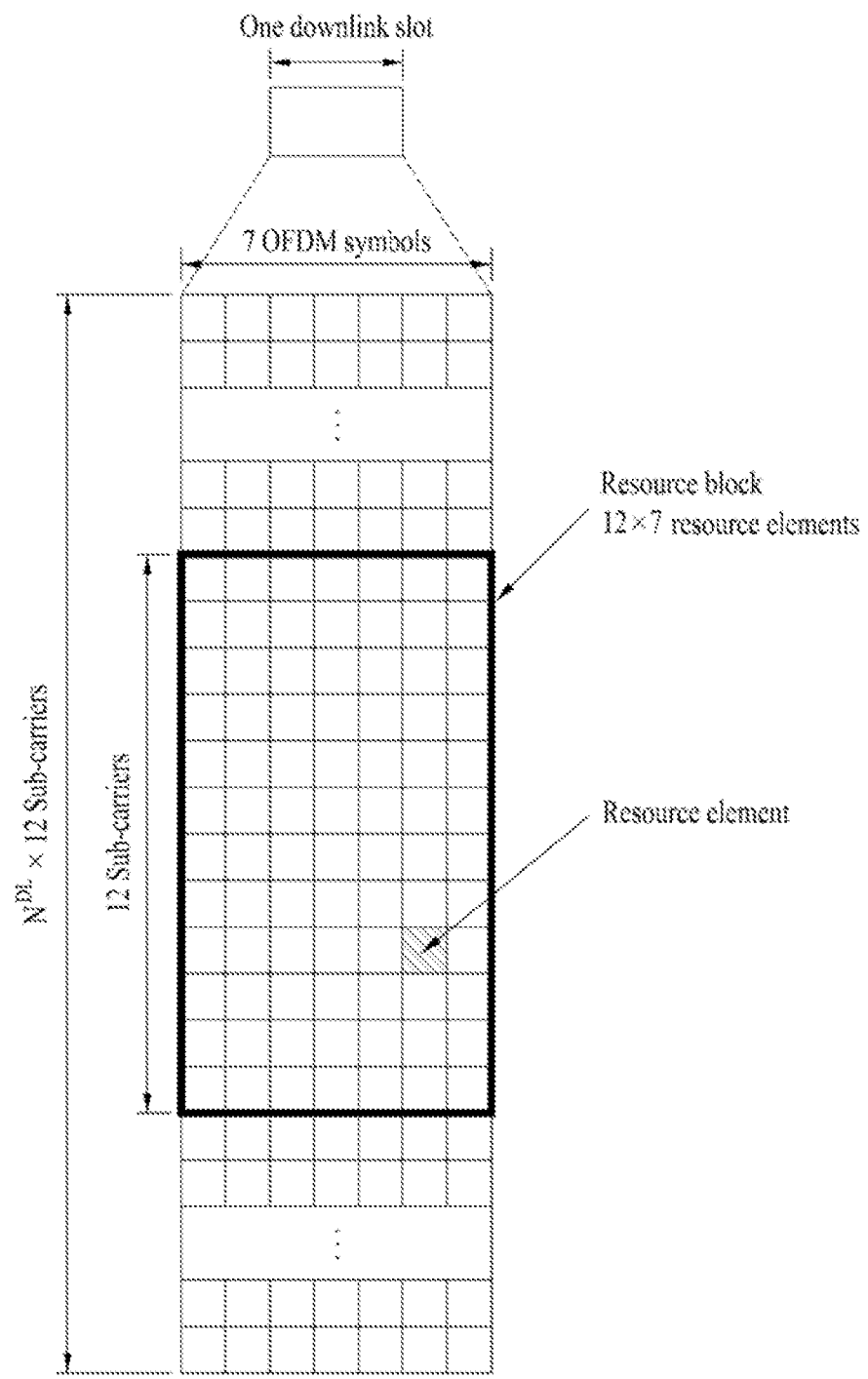
FIG. 2 illustrates a resource grid of a downlink slot.

FIG. 2 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 3:
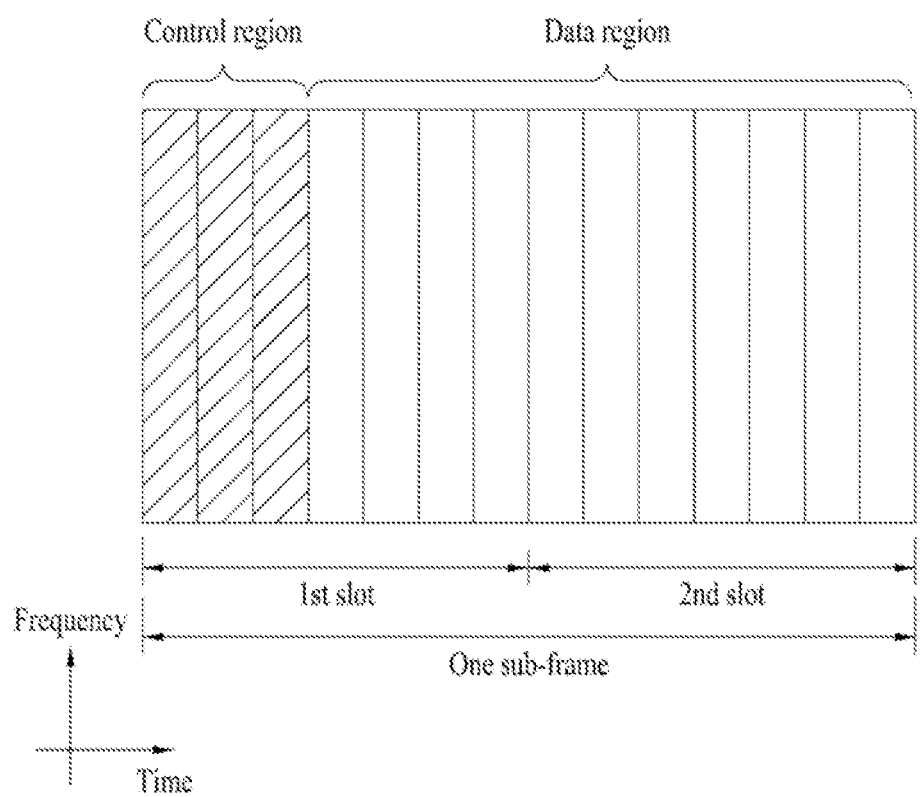
FIG. 3 illustrates a downlink subframe structure.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
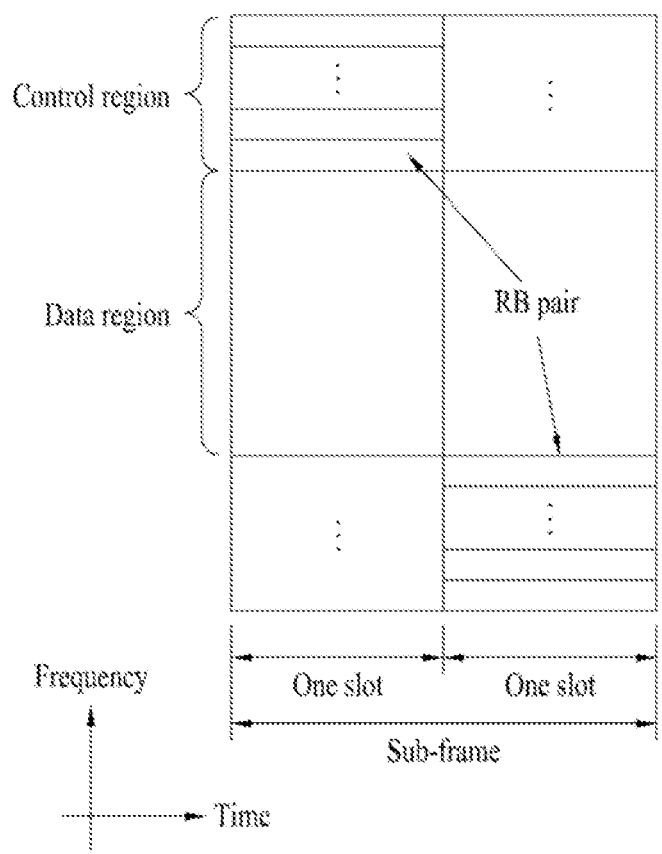
FIG. 4 illustrates an uplink subframe structure.

FIG. 4 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

MIMO System Modeling

FIG. 5 illustrates the configuration of a communication system including multiple antennas.

Referring to FIG. 5(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots s_{N_T}$. Let the transmission power levels of the transmission information be denoted by $P_1, P_2, \ldots, P_{N_T}$, respectively. Then the transmission power-controlled transmission information vector is given as follows.

$$\hat{s} = [\hat{s}_1, \hat{s}_2, \ldots, \hat{s}_{N_T}]^T = [Ps_1, Ps_2, \ldots, Ps_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} \quad \text{[Equation 5]}$$

-continued $$= \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \qquad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R1} & h_{N_R2} & \cdots & h_{N_RN_T} \end{bmatrix} \qquad \text{[Equation 8]}$$

Actual channels experience the above channel matrix H and then are added with Additive White Gaussian Noise (AWGN). The AWGN $n_1, n_2, \ldots n_{N_R}$ added to the $N_R$ Rx antennas is given as the following vector.

$$n = [n_1, n_2, \ldots, n_{N_R}]^T \qquad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. Accordingly, the rank of the matrix is not larger than the number of rows or columns. The rank of the matrix H, rank (H) is limited as follows.

$$\text{rank}(H) \leq \min(N_T, N_R) \qquad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

In the specification, 'rank' with respect to MIMO transmission represents the number of paths through which signals can be independently transmitted in a specific frequency resource at a specific instance and 'number of layers' refers to the number of signal streams transmitted through each path. Since a transmitter transmits as many layers as the number of ranks used for signal transmission, the rank corresponds to the number of layers unless otherwise mentioned.

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

Downlink Channel Status (CSI) Feedback

MIMO can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver can perform beamforming based on CSI to obtain MIMO Tx antenna multiplexing gain. The transmitter (e.g. eNB) can allocate an uplink control channel or an uplink shared channel to the receiver (e.g. UE) such that the receiver can feed back CSI.

CSI fed back may include a rank indicator (RI), a precoding matrix index (PMI) and a channel quality indictor (CQI).

The RI indicates information about a channel rank. The channel rank represents a maximum number of layers (or streams) through which different pieces of information can be transmitted through the same time-frequency resource. The RI is determined by long term fading of a channel, and thus the RI can be fed back to an eNB at a longer period than the PMI and CQI.

The PMI is information about a precoding matrix used for transmission from a transmitter and is a value in which spatial characteristics of a channel are reflected. Precoding refers to mapping a transport layer to a transmit antenna. A layer-to-antenna mapping relation can be determined by a precoding matrix. The PMI indicates a precoding matrix index of an eNB preferred by a UE based on a metric such as signal-interference plus noise ratio (SINR). To reduce feedback overhead of precoding information, the transmitter and receiver can share a codebook including precoding matrices and only an index indicating a specific precoding matrix in the codebook can be fed back.

The CQI indicates channel quality or channel intensity. The CQI can be represented as a predetermined MCS combination. That is, a fed back CQI index indicates a corresponding modulation scheme and a code rate. The CQI represents a value in which a reception SINR that can be obtained when an eNB configures a spatial channel using the PMI is reflected.

In a system supporting an extended antenna configuration (e.g. LTE-A), additional multi-user diversity is obtained using multi-user MIMO (MU-MIMO). When an eNB performs downlink transmission using CSI fed back by one of multiple UEs, it is necessary to prevent downlink transmission from interfering with other UEs since an interference channel is present between UEs multiplexed in the antenna domain in MU-MIMO. Accordingly, MU-MIMO requires more accurate CSI feedback than single user MIMO (SU-MIMO).

A new CSI feedback scheme that improves CSI composed of the RI, PMI and CQI can be applied in order to measure and report more accurate CSI. For example, precoding information fed back by a receiver can be indicated by a combination of two PMIs. One (first PMI) of the two PMIs is long term and/or wideband information and may be denoted as W1. The other PMI (second PMI) is short term and/or subband information and may be denoted as W1. A final PMI can be determined by a combination (or function) of W1 and W2. For example, if the final PMI is W, W can be defined as W=W1*W2 or W=W2*W1.

Here, W1 reflects frequency and/or temporal average characteristics of a channel. In other words, W1 can be defined as CSI reflecting characteristics of a long-term channel in the time domain, characteristics of a wideband channel in the frequency domain or characteristics of a long-term and wideband channel. To simply represent these characteristics of W1, W1 is referred to as long term-wideband CSI (or long term-wideband PMI) in this specification.

W2 reflects instantaneous channel characteristics compared to W1. In other words, W2 can be defined as CSI reflecting characteristics of a short-term channel in the time domain, characteristics of a subband channel in the frequency domain or characteristics of a short-term and subband channel. To simply represent these characteristics of W2, W2 is referred to as short term-subband CSI (or short term-subband PMI) in this specification.

To determine a final precoding matrix W from two different pieces of information (e.g. W1 and W2) representing channel states, it is necessary to configure separate codebooks (i.e. a first codebook for W1 and a second codebook for W2) composed of precoding matrices representing the information. A codebook configured in this manner may be called a hierarchical codebook. Determination of a final codebook using the hierarchical codebook is called hierarchical codebook transformation.

A codebook can be transformed using a long-term covariance matrix of a channel, represented by Equation 12, as exemplary hierarchical codebook transformation.

$$W = \text{norm}(W1 W2) \quad \text{Equation 12}$$

In Equation 12, W1 (long term-wideband PMI) denotes an element (i.e. codeword) constituting a codebook (e.g. first codebook) generated to reflect long term-wideband channel information. That is, W1 corresponds to a precoding matrix included in the first codebook that reflects the long term-wideband channel information. W2 (short term-subband PMI) represents a codeword constituting a codebook (e.g. second codebook) generated to reflect short term/subband channel information. That is, W2 corresponds to a precoding matrix included in the second codebook that reflects the short term-subband channel information. W is a codeword of a transformed final codebook and norm(A) denotes a matrix in which the norm of each column of matrix A is normalized to 1.

W1 and W2 may have structures as represented by Equation 13.

$$W1(i) = \begin{bmatrix} X_i & 0 \\ 0 & X_i \end{bmatrix}$$ [Equation 13]

$$W2(j) = \begin{bmatrix} \overbrace{e_M^k \quad e_M^l \quad e_M^m}^{r\ columns} \\ \alpha_j e_M^k \quad \beta_j e_M^l \quad \gamma_j e_M^m \end{bmatrix} (\text{if rank} = r)$$ [Equation 14]

In Equation 13, W1 can be defined as a block diagonal matrix and blocks correspond to the same matrix $X_i$. A block $X_i$ can be defined as a (Nt/2)×M matrix. Here, Nt denotes the number of Tx antennas. $e_M^p$ (p=k, l, . . . , m) is an M×1 vector wherein a p-th element of M vector elements represents 1 and other elements represent 0. When W1 is multiplied by $e_M^p$, a p-th column is selected from columns of W1 and thus this vector can be called a selection vector. The number of vectors fed back at a time to represent a long term-wideband channel increases as M increases, to thereby improve feedback accuracy. However, the codebook size of W1 fed back with low frequency decreases and the codebook size of W2 fed back with high frequency increases as M increases, increasing feedback overhead. That is, there is a tradeoff between feedback overhead and feedback accuracy. Accordingly, M can be determined such that feedback overhead is not excessively increased and appropriate feedback accuracy is maintained. As to W2, $\alpha_j$, $\beta_j$, and are predetermined phase values. In Equation 13, 1≤k, l, m≤M and k, l and m are integers.

The codebook structure represented by Equation 13 uses a cross polarized antenna configuration and reflects correlation characteristics of a channel, generated when antenna spacing is narrow (when a distance between neighboring antennas is less than half a signal wavelength). For example, cross polarized antenna configurations may be represented as shown in Table 1.

TABLE 1

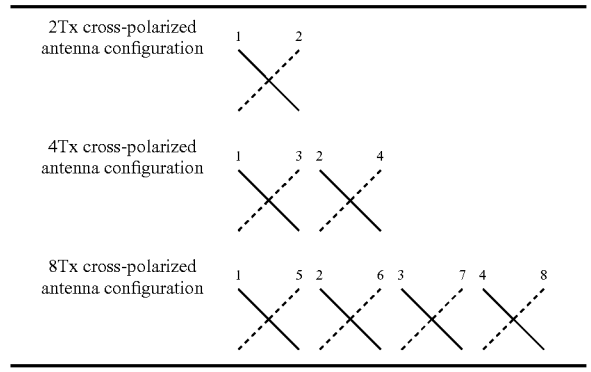

In Table 1, an 8Tx cross polarized antenna configuration is composed of two antenna groups having orthogonal polarizations. Antennas belonging to antenna group 1 (antennas 1, 2, 3 and 4) may have the same polarization (e.g. vertical polarization) and antennas belonging to antenna group 2 (antennas 5, 6 7 and 8) may have the same polarization (e.g. horizontal polarization). The two antenna groups are co-located. For example, antennas 1 and 5 can be co-located, antennas 2 and 6 can be co-located, antennas 3 and 7 can be co-located and antennas 2 and 8 can be co-located. In other words, antennas in an antenna group have the same polarization as in a uniform linear array (ULA) and a correlation between antennas in an antenna group has a linear phase increment characteristic. Furthermore, a correlation between antenna groups has a phase rotation characteristic.

Since a codebook is composed of values obtained by quantizing a channel, it is necessary to design the codebook by reflecting actual channel characteristics therein. To describe reflection of actual channel characteristics in codewords of a codebook designed as represented by Equation 13, a rank-1 codebook is exemplified. Equation 14 represents determination of a final codeword W by multiplying codeword W1 by codeword W2 in the case of rank 1.

$$W1(i) * W2(j) = \begin{bmatrix} X_i(k) \\ \alpha_j X_i(k) \end{bmatrix}$$ [Equation 14]

In Equation 14, the final codeword is represented by a vector of Nt×1 and is composed of an upper vector $X_i(k)$ and a lower vector $\alpha_j X_i(k)$ which respectively represent correlations between horizontal antenna groups and vertical antenna groups of cross polarized antennas. $X_i(k)$ is preferably represented as a vector (e.g. DFT matrix) having linear phase increment in which correlation between antennas in each antenna group is reflected.

When the above-described codebook is used, higher channel feedback accuracy can be achieved compared to a case in which a single codebook is used. Single-cell MU-MIMO can be performed using high accuracy channel feedback and thus high accuracy channel feedback is necessary for CoMP operation. For example, plural eNBs cooperatively transmit the same data to a specific UE in CoMP JT operation, and thus this system can be theoretically regarded as a MIMO system in which plural antennas are geographically distributed. That is, even when MU-MIMO operation is performed in CoMP JT, high channel information accuracy is necessary to avoid interference between co-scheduled UEs. In addition, CoMP CB also requires accurate channel information in order to avoid interference of a neighboring cell, applied to a serving cell.

REFERENCE SIGNAL (RS)

Since a packet is transmitted through a radio channel in a wireless communication system, a signal may be distorted during transmission. A receiver needs to correct the distorted signal using channel information in order to correctly receive the distorted signal. To detect channel information, a signal known to both the receiver and a transmitter is transmitted and channel information is detected using a degree of distortion of the signal when the signal is received through a certain channel. This signal is called a pilot signal or a reference signal.

When multiple antennas are used to transmit and receive data, a correct signal can be received only when channel state between each Tx antenna and each Rx antenna is detected. Accordingly, a reference signal is required for each Tx antenna.

In legacy wireless communication systems (e.g. 3GPP LTE release-8 or release-9), a downlink reference signal defines a common reference signal (CRS) shared by all UEs in a cell and a dedicated reference signal (DRS) dedicated to a specific UE. Information for channel estimation and demodulation can be provided according to these reference signals.

A receiver (UE) can estimate channel state from the CRS and feed back an indicator related to channel quality, such as a channel quality indicator (CQI), a precoding matrix index (PMI) and/or a rank indicator (RI), to a transmitter (eNB). The CRS may be called a cell-specific reference signal.

The DRS can be transmitted through a corresponding RE when data demodulation is needed. Presence or absence of the DRS may be signaled to the UE by a higher layer. In addition, the fact that the DRS is valid only when a corresponding PDSCH is mapped may be signaled to the UE. The DRS may be called a UE-specific reference signal or a demodulation reference signal.

To provide higher spectral efficiency than 3GPP LTE (e.g. LTE release-8 or release-9), a system (e.g. LTE-A (Advanced)) having an extended antenna configuration may be designed. The extended antenna configuration may be an 8Tx antenna configuration. The system having the extended antenna configuration needs to support UEs operating in a conventional antenna configuration. That is, the system needs to support backward compatibility. Accordingly, it is necessary to support a reference signal pattern according to the conventional antenna configuration and to design a new reference signal pattern for an additional antenna configuration.

Since LTE defines the downlink reference signal only for a maximum of 4 antenna ports, if an eNB has up to 8 downlink Tx antennas in LTE-A, RSs for up to 8 Tx antennas need to be additionally defined. Both an RS for channel measurement and an RS for data demodulation need to be considered as the RSs for up to 8 Tx antennas.

When the RSs for up to 8 Tx antennas are added to a time-frequency region in which a CRS defined in LTE is transmitted per subframe through a whole band, RS overhead excessively increases during RS transmission. Therefore, it is necessary to consider reduction of RS overhead when the RSs for up to 8 Tx antennas are newly designed.

RSs newly introduced to LTE-A may be categorized into a channel state information RS (CSI-RS) for channel measurement for calculation/selection of a RI, PMI, CQI, etc. and a demodulation RS (DM RS) for demodulation of data transmitted through a maximum of 8 Tx antennas.

The CSI-RS is designed mainly for channel measurement, unlike the CRS of LTE, which is used for channel measurement, handover measurement and data demodulation. The CSI-RS may also be used for handover measurement. Since the CSI-RS is mainly used to obtain channel state information, the CSI-RS need not be transmitted per subframe unlike the CRS of LTE. Accordingly, the CSI-RS can be designed such that it is intermittently (e.g. periodically) transmitted in the time domain to reduce CSI-RS overhead.

Figure 6:
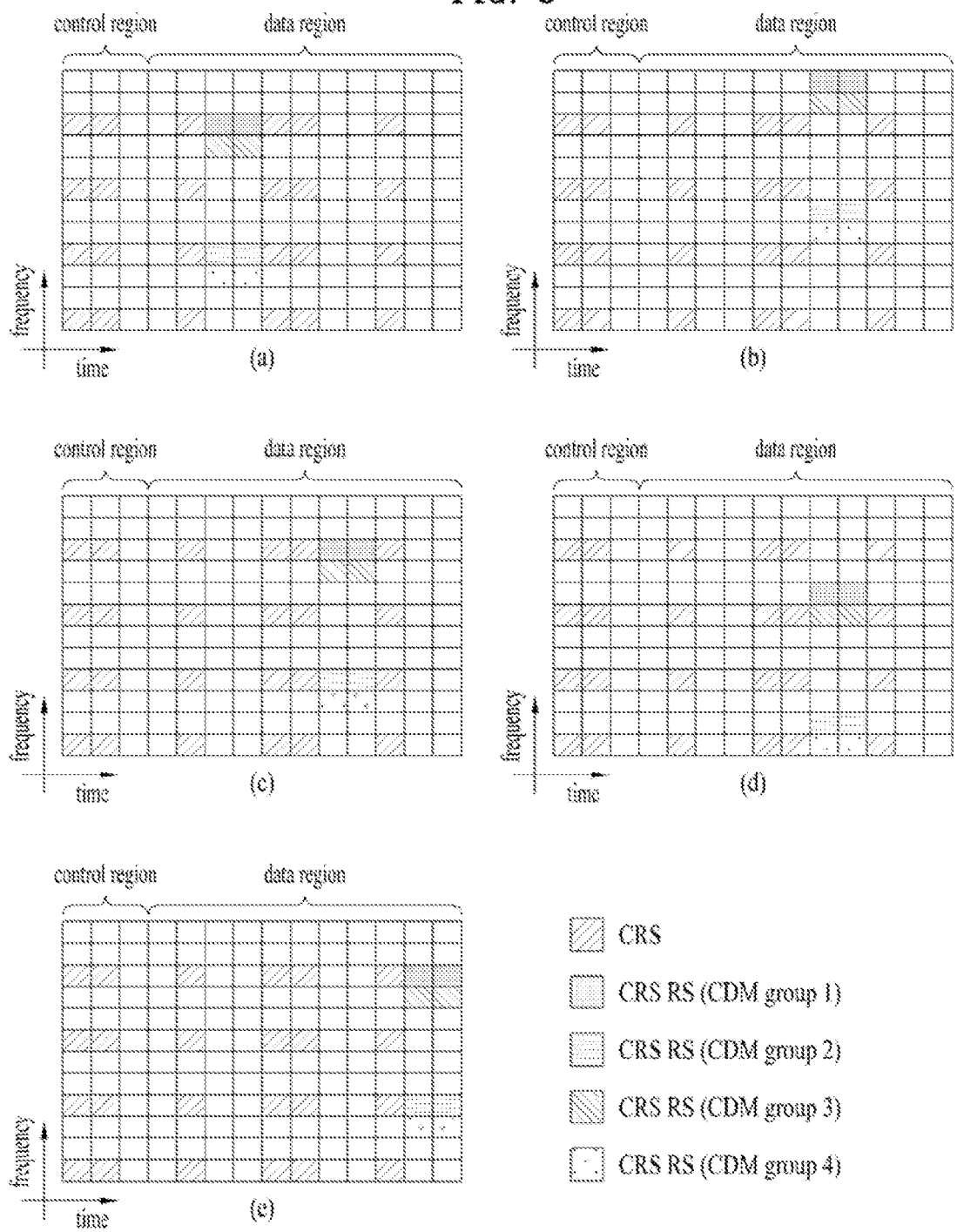
FIG. 6 illustrates exemplary CSI-RS patterns.

FIG. 6 illustrates exemplary CSI-RS patterns. FIG. 6 shows positions of REs through which a CRS-RS is transmitted on an RB pair (12 OFDM symbols in the time domain×12 subcarriers in the frequency domain in the case of normal CP) carrying downlink data. One of CSI-RS patterns of FIGS. 6(a) to 6(e) can be used in a downlink subframe. CSI-RSs can be transmitted for 8 antenna ports (antenna port indices 15 to 22) additionally defined in LTE-A. CSI-RSs for different antenna ports may be located in different frequency resources (subcarriers) and/or different time resources (OFDM symbols) (that is, the CSI-RSs may be multiplexed according to FDM and/or TDM). CSI-RSs for different antenna ports, located on the same time-frequency resources, may be discriminated by orthogonal codes (that is, the CSI-RSs may be multiplexed according to CDM). In FIG. 6(a), CSI-RSs for antenna ports 15 and 16 can be located in REs represented by CSI-RS CDM group 1 and multiplexed by orthogonal codes. CSI-RSs for antenna ports 17 and 18 can be located in REs represented by CSI-RS CDM group 2 and multiplexed by orthogonal codes. CSI-RSs for antenna ports 19 and 20 can be located in REs represented by CSI-RS CDM group 3 and multiplexed by orthogonal codes. CSI-RSs for antenna ports 21 and 22 can be located in REs represented by CSI-RS CDM group 4 and multiplexed by orthogonal codes. The principle described with reference to FIG. 6(a) is equally applied to FIGS. 6(b) to 6(e).

When data is transmitted on a downlink subframe, a DM RS is transmitted to a UE scheduled to receive the data. A DM RS for a specific UE can be designed such that it is transmitted only in a resource region for which the specific UE is scheduled, that is, a time-frequency region in which data for the specific UE is transmitted.

CQI Calculation

A description will be given of a method of configuring/defining a resource (referred to as a reference resource hereinafter) that is a reference for calculation of a CQI when a UE reports CSI. First, the CQI will be defined.

A CQI reported by a UE corresponds to a specific index value. A CQI index indicates a modulation scheme, a code rate, etc. corresponding to a channel state. For example, CQI indices and definitions thereof are shown in Table 2.

TABLE 2

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The UE can determine a CQI index that satisfies a predetermined condition from among CQI indices 1 to 15 of Table 2 for each CQI value reported in an uplink subframe n. The predetermined condition may be determined such that a single PDSCH transport block occupying a group of downlink physical resource blocks called CQI reference resources can be received at a transport block error probability of less than 0.1 (i.e. 10%) with a combination of a modulation scheme and a transport block size corresponding to the determined CQI index. If CQI index 1 does not satisfy the condition, the UE can determine CQI index 0.

In the case of transmission mode 9 (corresponding to transmission of a maximum of 8 layers) and a feedback reporting mode, the UE can perform channel measurement to calculate a CQI value reported in the uplink subframe n based on CSI-RS only. In other transmission modes and reporting modes corresponding thereto, the UE can perform channel measurement for CQI calculation on the basis of CRS.

A combination of a modulation scheme and a transport block size may correspond to a CQI index when the following conditions are all satisfied. The combination may be signaled for transmission on a PDSCH in a CQI reference resource according to a related transport block size table. When the modulation scheme is indicated by the corresponding CQI index and the combination of the modulation scheme and transport block size is applied to the reference resource, the combination has an effective channel code rate closest to a code rate indicated by the corresponding CQI index under the above-described condition. If two or more combinations of a transport block size and a modulation scheme are closest to the code rate indicated by the corresponding CQI index, a combination corresponding to a minimum transport block size can be selected.

The CQI reference resource is defined as follows.

The CQI reference resource is defined as a group of downlink physical resource blocks having derived CQI values corresponding to a related band in the frequency domain.

The CQI reference resource is defined as a single downlink subframe $n-n_{CQI\_ref}$ in the time domain. Here, $n_{CQI\_ref}$ is determined as a value that is a minimum value from among values greater than 4 and corresponds to a valid downlink subframe in the case of periodic CQI reporting. In the case of aperiodic CQI reporting, $n_{CQI\_ref}$ is determined as the same reference resource as a valid downlink subframe corresponding to a CQI request in an uplink DCI format (that is, PDCCH DCI format for providing uplink scheduling control information to a UE). Furthermore, $n_{CQI\_ref}$ is 4 and the downlink subframe $n-n_{CQI\_ref}$ corresponds to a valid downlink subframe in the case of aperiodic CQI reporting. Here, the downlink subframe $n-n_{CQI\_ref}$ can be received after a subframe corresponding to a CQI request in a random access response grant. The valid downlink subframe refers to a downlink subframe that is set for a corresponding UE, does not correspond to multicast/broadcast over a single frequency network (MBSFN) subframe in transmission modes other than transmission mode 9, does not include a DwPTS field when a DwPTS length is less than 7680*Ts (Ts=1/(15000×2048) seconds) and does not belong to a measurement gap set for the corresponding UE. If a valid downlink subframe for the CQI reference resource is not present, CQI reporting can be omitted in the uplink subframe n.

The CQI reference resource is defined as an RI and a PMI related to CQI in a layer region.

When the UE derives a CQI index from the CQI reference resource, the following can be assumed: (1) the first three OFDM symbols of a downlink subframe are used for control signaling; (2) a resource element used by a primary synchronization signal, a secondary synchronization signal or a physical broadcast signal is not present; (3) the CQI reference resource has the CP length of a non-MBSFN subframe; (4) redundancy version is 0; (5) the ratio of a CSI-RS energy per resource element (EPRE) to a PDSCH EPRE is a predetermined value signaled by a higher layer when a CSI-RS is used for channel measurement; (6) a PDSCH transmission scheme (single antenna port transmission, transport diversity, spatial multiplexing, MU-MIMO, etc.) defined per transmission mode is currently set for the corresponding UE (which may be a default mode); and (7) the radio of a CRS EPRE to PDSCH EPRE may be determined under a predetermined condition when a CRS is used for channel measurement. Refer to 3GPP TS36.213 for a detailed definition of CQI.

That is, the UE can set a previous specific single subframe as the CQI reference resource based on the current CQI calculation instance and calculate a CQI value such that error probability does not exceed 10% when a PDSCH is transmitted in the CQI reference resource. This CQI calculation scheme is ideal under the condition that signal intensity and interference intensity can be measured in all subframes other than specific subframes (e.g. subframes that belong to a measurement gap or have a PDSCH transmission region less than a predetermined value).

However, when signal intensity and/or interference cannot be measured in most subframes under the same condition, the above-described CQI calculation scheme may not correctly configure a single subframe as a CQI reference resource and calculate a CQI.

For example, signal characteristics (e.g. intensity of a received signal, etc.) are measured through a CSI-RS in transmission mode 9. Here, the CSI-RS is periodically transmitted in some subframes only, rather than being transmitted in each subframe. Accordingly, when a subframe is set as a CQI reference resource, a signal measurement result varies according to whether a CSI-RS is transmitted in the corresponding subframe. Therefore, the CQI reference resource needs to be determined in consideration of whether a CSI-RS is transmitted in a corresponding subframe.

For inter-cell interference coordination, a neighboring cell may perform silencing in a specific subframe. Silencing refers to no transmission of most signals other than a minimum essential signal, that is, blanking. In this case, when an arbitrary subframe is set to a CQI reference resource, an interference measurement result varies according to whether the neighboring cell performs silencing in the arbitrary subframe. Accordingly, a serving cell needs to signal one or more subframe sets to a UE and instruct the UE to perform interference measurement on the assumption that the neighboring cell causes the same level of interference in subframes belonging to the same subframe set. That is, when the UE measures interference in a specific subframe set, the CQI reference resource needs to be limited to subframes belonging to the specific subframe set.

FIG. 7 illustrates an example of setting a CQI reference resource.

The example of FIG. 7 is based on the assumption that subframes 1, 5, 9 and 13 suffer the same interference and are set to subframe set 1 and subframes 3, 7, 11 and 15 suffer an equal level of interference and are set to subframe set 2. In addition, it is assumed that a CSI-RS is transmitted in intervals of 5 ms (that is, 5 subframes) starting from subframe 1. In this case, when a UE set to transmission mode 9 attempts to calculate a CQI for subframe set 1 in subframe 14, a subframe that belongs to subframe set 1 and carries the CSI-RS needs to be set as the CQI reference resource. A subframe closest to subframe 14, from among subframes which satisfy the above-described condition, is subframe 1 and thus subframe 1 is set to the CQI reference resource. Similarly, when the UE calculates a CQI for subframe set 2, a subframe that belongs to subframe set 2 and carries the CSI-RS can be set as the CQI reference resource. That is, the CQI is for subframe set 1 when the CQI reference resource belongs to subframe set 1 and for subframe set 2 when the CQI reference resource belongs to subframe set 2.

When the CQI reference resource is set in this manner, a very large time difference is present between the CQI calculation instance (i.e. subframe 14) and the CQI reference resource (i.e. subframe 1) and thus there is a high possibility that a result of measurement of a signal and interference based on the CQI reference resource does not correctly reflect channel state of the CQI calculation instance (i.e. channel state remarkably varies between subframe 1 and subframe 14 in the above example). Accordingly, when the above-described CQI reference resource configuration scheme is applied to an advanced wireless communication system in which the CSI-RS is transmitted in some subframes only and interference degrees may differ in subframes, channel measurement accuracy decreases. Therefore, a description will be given of a method of configuring a CQI reference resource and calculating a CQI according to embodiments of the present invention to solve the above problem.

Virtual CQI Reference Resource

The present invention proposes a method of setting a virtual CQI reference resource when a UE calculates a CQI. The virtual CQI reference resource refers to a resource that is a reference for CQI calculation and does not represent signal and interference characteristics observed therein. That is, the virtual CQI reference resource is set to a past specific instance on the basis of the instance when the UE calculates a CQI. The UE can calculate a CQI such that error probability when a PDSCH is transmitted on the virtual CQI reference resource is less than a predetermined level (e.g. 10%). The virtual CQI reference resource may be defined in predetermined units in the time domain and frequency domain. For example, the virtual CQI reference resource can be defined on a subframe basis, PRB basis, slot basis or RE basis.

In the case of a conventional CQI reference resource, actual signal and interference characteristics on a resource set to the CQI reference resource are used. In the case of the virtual CQI reference resource, however, signal and interference characteristics determined based on the virtual CQI reference resource may differ from actual signal and interference characteristics on a resource set to the virtual CQI reference resource. That is, the virtual CQI reference resource can be a nominal reference resource that is not restricted by the conventional CQI reference resource and is used to calculate a CQI at a desired instance (i.e. virtual CQI reference resource instance) using signal characteristics in a subframe set having desired signal characteristics and interference characteristics in a subframe having desired interference characteristics.

More specifically, signal characteristics of the virtual CQI reference resource may be determined based on signal characteristics observed in a specific subframe set unrelated to the virtual CQI reference resource (i.e. subframe set to which the virtual CQI reference resource belongs or not). That is, the signal characteristics of the virtual CQI reference resource are determined by processing signal characteristics in a specific subframe. Here, the specific subframe may not include a subframe present at the same instance with the virtual CQI reference resource.

Interference characteristics of the virtual CQI reference resource may be determined based on interference characteristics observed in a specific subframe set unrelated to the virtual CQI reference resource (i.e. subframe set to which the virtual CQI reference resource belongs or not). A specific resource related to observation of interference characteristics may be defined as an interference measurement resource. The interference measurement resource may be provided in the form of a subframe set or an RE set, for example. The interference characteristics of the virtual CQI reference resource are determined by processing interference characteristics in the interference measurement resource (e.g. a specific subframe set). Here, the specific subframe may not include a subframe present at the same instance with the virtual CQI reference resource. A subframe set related to determination of the interference characteristics of the virtual CQI reference resource may differ from a subframe set related to determination of the signal characteristics of the virtual CQI reference resource.

FIG. 8 illustrates an example of setting the virtual CQI reference resource.

It is assumed that 3 ms is required to calculate a CQI when a UE calculates the CQI in subframe 14 and thus the virtual CQI reference resource corresponds to subframe 10 closest to subframes 14 from among subframes more than 3 ms in advance of subframe 14 by 3 ms or more. The UE can calculate a CQI value in the virtual CQI reference resource on the assumption that the virtual CQI reference resource has the same signal characteristics as those of a specific subframe and the same interference characteristics as those of another specific subframe.

Specifically, the UE needs to measure signal characteristics using a CSI-RS when the UE is set to transmission mode 9. Accordingly, the UE can measure signal characteristics from a CSI-RS received prior to the virtual CQI reference resource and determine signal characteristics (e.g. the intensity of a received signal, etc.) in the virtual CQI reference resource based on the measured signal characteristics. In the example of FIG. 8, the UE can measure signal characteristics in subframes 1 and 6 from CSI-RSs transmitted in subframes 1 and 6 and determine signal characteristics in the virtual CQI reference resource by estimating how the signal characteristics in subframe 1 and/or subframe 6 will be changed in subframe 10 (i.e. virtual CQI reference resource).

It is assumed that the UE calculates a CQI value when the CQI value has the same interference characteristics as those of subframe set 1 (subframes 1, 5, 9, 13, ... ). In this case, the UE can measure interference characteristics in subframes belonging to subframe set 1 prior to the virtual CQI reference resource and determine interference characteristics in the virtual CQI reference resource based on the measured interference characteristics. In the example of FIG. 8, the UE can measure interference characteristics in subframes 1, 5 and 9 and determine interference characteristics in the virtual CQI reference resource by estimating how the interference characteristics in subframe 1, subframe 5 and/or subframe 9 will be changed in subframe 10 (i.e. virtual CQI reference resource).

Based on the signal and interference characteristics in the virtual CQI reference resource, estimated as above, the UE can calculate the CQI value on the assumption that a PDSCH is transmitted on the virtual CQI reference resource.

A description will be given of embodiments of the present invention regarding a method of determining a virtual CQI reference resource, a method of determining signal characteristics in the virtual CQI reference resource and a method of determining interference characteristics in the virtual CQI reference resource.

EMBODIMENT 1

The present embodiment relates to a method of determining the position (or timing) of the virtual CQI reference resource in the time domain.

The virtual CQI reference resource may be configured in the same manner as the conventional CQI reference resource in the time domain. For example, when CSI reporting is performed in a subframe n, the virtual CQI reference resource can be defined as a downlink subframe n−k in the time domain. Here, k can be set to a minimum value from among values greater than 4 in order to minimize a time difference between the subframe n in which CSI reporting is performed and the subframe n−k in consideration of CSI processing time of 3 ms. However, the virtual CQI reference resource need not be set to a valid subframe, distinguished from the conventional CQI reference resource defined in the time domain. In addition, the virtual CQI reference resource may be set to a subframe present in a measurement gap or a subframe having a DwPTS length less than a predetermined value (e.g. 7680*Ts). This is because the virtual CQI reference resource is nominally defined in the time domain and valid downlink transmission need not be performed at a corresponding instance.

That is, the virtual CQI reference resource can be set to subframe n−k (k being a minimum value from among values greater than 4) in the time domain when CSI is reported in subframe n and is not restricted by subframe validity.

EMBODIMENT 2

The present embodiment relates to a method of determining signal characteristics in the virtual CQI reference resource.

Signal characteristics with respect to the virtual CQI reference resource may be determined through a CSI-RS in transmission mode 9 and determined through a CRS in other transmission modes.

In the case of a UE set to transmission mode 9, the CSI-RS need not be present in the virtual CQI reference resource and signal characteristics of the virtual CQI reference resource can be determined based on other subframes in which the CSI-RS is present. For example, if signal characteristics of the virtual CQI reference resource are determined based on signal characteristics of other subframes, the signal characteristics of the other subframes may be used as the signal characteristics of the virtual CQI reference resource or appropriately processed by reflecting channel state variation with time. Otherwise, the signal characteristics of the other subframes may be simply averaged or an estimate may be determined from statistics to determine the signal characteristics of the virtual CQI reference resource.

In other transmission modes, signal characteristics of the virtual CQI reference resource can be directly determined since a CRS is present per subframe.

EMBODIMENT 3

The present embodiment relates to a method of determining interference characteristics in the virtual CQI reference resource.

For CSI reporting, CSI measurement subframe sets may be configured for a UE through higher layer signaling. When the CSI measurement subframe sets are configured, the UE needs to determine a subframe set, which is a target of CSI reporting, in the subframe n in which the CSI is reported. The subframe set corresponding to a target of CSI reporting can be referred to as an interference measurement resource. The interference measurement resource may be defined independently of the CSI measurement subframe sets configured by a higher layer. That is, a CSI measurement subframe refers to a subframe which is a reference for CSI measurement by a UE, whereas the interference measurement resource refers to a resource (e.g. interference measurement subframe) from which a UE measures interference necessary for CSI calculation. While a UE may operate (i.e. calculate CSI based on interference observed in the CSI measurement subframe) on the assumption that the CSI measurement subframe and the interference measurement subframe are identical to each other when there is no instruction from an eNB, the interference measurement resource may be set independently of the CSI measurement subframe when the interference measurement resource is explicitly indicated. That is, the UE needs to measure interference for CSI reporting and the eNB (or network) can signal a resource (i.e. interference measurement resource) corresponding to a target of interference measurement to the UE explicitly or implicitly.

The UE can measure interference in the interference measurement subframe set and indirectly determine interference characteristics in the virtual CQI reference resource on the basis of the interference measurement result. For example, if the virtual CQI reference resource is different from the interference measurement subframe set indicated by the eNB, interference characteristics in the interference measurement subframe set may be used or appropriately processed by reflecting channel state variation with time. Otherwise, the interference characteristics in the interference measurement subframe set may be simply averaged or an estimate may be determined from statistics to determine the interference characteristics in the virtual CQI reference resource.

A description will be given of a method of setting the interference measurement subframe set in the case of aperiodic CSI reporting and in the case of periodic CSI reporting.

Embodiment 3-1

In the case of aperiodic CSI reporting, the eNB may transmit a CSI reporting triggering message (e.g. a CSI request field included in an uplink DCI format (DCI format 0 or 4)) to the UE through a PDCCH and the UE may report CSI in response to the CSI reporting triggering message. The eNB may indicate a subframe set corresponding to a target of CSI reporting directly or indirectly.

In the case of direct indication, an additional field directly indicating CSI measurement subframe sets may be defined in a PDCCH DCI format. A subframe set corresponding to a target of CSI reporting can be indicated through the field. The field can indicate an interference measurement subframe set used by the UE to report CSI. In this case, the UE can perform measurement in the indicated subframe set and determine interference characteristics in the virtual CQI reference resource on the basis of the measurement result.

In the case of indirect indication, an additional field is not present in the PDCCH and an interference measurement subframe set may be implicitly determined based on the position (or index) of a subframe in which the CSI reporting triggering message is transmitted. When the subframe in which the triggering message is transmitted is included in the CSI measurement subframe sets configured for the UE, the UE can measure interference in the subframe set including the subframe in which the triggering message is transmitted and determine interference characteristics in the virtual CQI reference resource on the basis of the measurement result.

When the subframe in which the triggering message is transmitted is not included in the CSI measurement subframe sets configured for the UE, the UE can determine a subframe belonging to and closest to one of the CSI measurement subframe sets configured for the UE from among subframes prior to the subframe in which the triggering message is transmitted, measure interference in the subframe set including the subframe and determine interference characteristics in the virtual CQI reference resource on the basis of the measurement result.

Embodiment 3-2

In the case of periodic CSI reporting, the UE may report CSI using a resource semi-statically set through higher layer signaling. In periodic CSI reporting, the eNB may signal a subframe set corresponding to a target of CSI reporting to the UE through higher layer signaling. The UE can measure interference in the subframe set (i.e. interference measurement subframe set) indicated by the eNB and determine interference characteristics in the virtual CQI reference resource.

Descriptions of embodiments 3-1 and 3-2 may be added to suppositions (i.e. suppositions on which the UE derives a CQI index, described above in the CQI reference resource section).

For example, a CQI index can be derived in consideration of the following when direct indication is applied to aperiodic reporting.

When CSI measurement subframe sets are configured through higher layer signaling, the UE attempts to perform interference measurement to calculate a CQI value reported in an uplink subframe n based only on a measurement subframe set corresponding to a CQI request of an uplink DCI format in the case of aperiodic reporting and attempts to perform interference measurement to calculate the CQI value reported in the uplink subframe n based only on a measurement subframe set indicated through higher layer signaling in the case of periodic reporting.

When indirect indication is applied to aperiodic reporting, a CQI index can be derived in additional consideration of the following.

When CSI measurement subframe sets are configured by higher layer signaling, the UE attempts to perform interference measurement to calculate a CQI value reported in the uplink subframe n based only on a measurement subframe set including a subframe n−k (k being a minimum value greater than 4 and being determined such that subframe n−k corresponds to a valid downlink subframe belonging to the CSI measurement subframe sets) in the case of aperiodic reporting and attempts to perform interference measurement to calculate the CQI value reported in the uplink subframe n based only on a measurement subframe set indicated by higher layer signaling in the case of periodic reporting.

Since interference characteristics or interference measurement refer to measurement of parts other than a signal from a serving cell in the above description, interference characteristics or interference measurement may be referred to as non-signal part measurement or non-channel part measurement.

EMBODIMENT 4

The present embodiment relates to a method of setting an interference measurement resource.

As described above, the interference measurement resource may be explicitly signaled to the UE by the eNB through a PDCCH or a higher layer signal or implicitly indicated through different signaling. While the interference measurement resource is set to a specific subframe or a subframe set in the above-described embodiments, the interference measurement resource may be set to a set of REs in a subframe set.

For example, the eNB can signal positions of REs in a specific pattern within a specific subframe set to the UE through a higher layer signal and instruct the UE to perform interference measurement for CQI calculation based on the REs. The eNB can signal one or more interference measurement resource sets to the UE. An interference measurement resource set may include plural REs and respective interference measurement resource sets may be used to measure different interference states. The eNB may configure REs constituting an interference measurement resource set in an appropriate pattern.

For example, an RE pattern for interference measurement can be indicated as a CSI-RS pattern. The CSI-RS pattern has been described with reference to FIG. 6. In FIGS. 6(a) to 6(e), 8 REs define a CSI-RS pattern for 8 antenna ports. In the case of fewer antenna ports, fewer REs can define a CSI-RS pattern. Accordingly, all or some REs of one CSI-RS pattern (8 REs) can be designated as the interference measurement resource according to the present invention. Furthermore, for more accurate interference measurement, a set of plural CSI-RS patterns may be designated as the interference measurement resource according to the present invention to perform interference measurement on more than 8 REs.

An interference level measured by the UE in an RE carrying a CSI-RS may differ from interference levels measured by the UE in other REs even in the same subframe of the same cell. This is because a CSI-RS transmission RE of the serving cell can be set such that a neighboring cell does not transmit a CSI-RS in the CSI-RS transmission RE of the serving cell, for example. Furthermore, interference measured in the CSI-RS transmission RE cannot be used for channel estimation for PDSCH demodulation because a PDSCH is transmitted in an RE other than the CSI-RS transmission RE and interference in the CSI-RS transmission RE may differ from interference in other REs, as described above, and thus a measurement result obtained from the CSI-RS transmission RE cannot be used as a channel estimation value in the PDSCH transmission RE. Accordingly, a CSI-RS pattern is preferably used as the interference measurement resource.

In addition, the eNB may additionally inform the UE that no signal is transmitted from the serving cell (or transmit power is 0) in the interference measurement resource while signaling the interference measurement resource to the UE. Accordingly, the UE can perform interference measurement more conveniently. Since interference measurement refers to measurement of signals other than a signal from the serving cell, the UE can easily perform interference measurement in the interference measurement resource through which a signal is not transmitted from the serving cell.

For example, when the interference measurement resource is set to a CSI-RS pattern, the UE can perform interference measurement more easily. Specifically, plural CSI-RS configurations can be used in a cell and the plural CSI-RS configurations can include a configuration in which the UE assumes non-zero transmit power for a CSI-RS and/or a configuration in which the UE assumes zero transmit power for the CSI-RS. For example, a specific CSI-RS can be set to zero transmit power, which means that corresponding REs can be set to null REs. A null RE refers to an RE in which a signal is not transmitted from the serving cell. The UE can perform interference measurement more easily using null REs. That is, when REs corresponding to CSI-RS patterns set to zero transmit power are set to the interference measurement resource, the UE can recognize that no signal is transmitted from the serving cell through the REs and easily perform interference measurement in the REs.

The eNB may configure one or more interference measurement resource sets, signal the one or more interference measurement resource sets to the UE and instruct the UE to measure different interference states in different interference measurement resource sets. For example, if the interference measurement resource is configured as CSI-RS patterns, an interference measurement resource set may correspond to a CSI-RS pattern. For example, the eNB can signal an interference measurement resource set corresponding to the CSI-RS pattern of FIG. 6(a) and another interference measurement resource set corresponding to the CSI-RS pattern of FIG. 6(e) to the UE and instruct the UE to respectively measure interference in the interference measurement resource sets.

While the interference measurement resource is set as a CSI-RS pattern in the above description, the present invention is not limited thereto. For example, the interference measurement resource can be set to an RE pattern different from a CSI-RS pattern. A CRS transmission RE pattern may be set to the interference measurement resource. While the interference measurement resource is set to a CSI-RS pattern in the following description to aid in understanding the principle of the present invention, the principle of the present invention can be equally applied to a case in which the interference measurement resource is set to other RE patterns.

Figure 9:
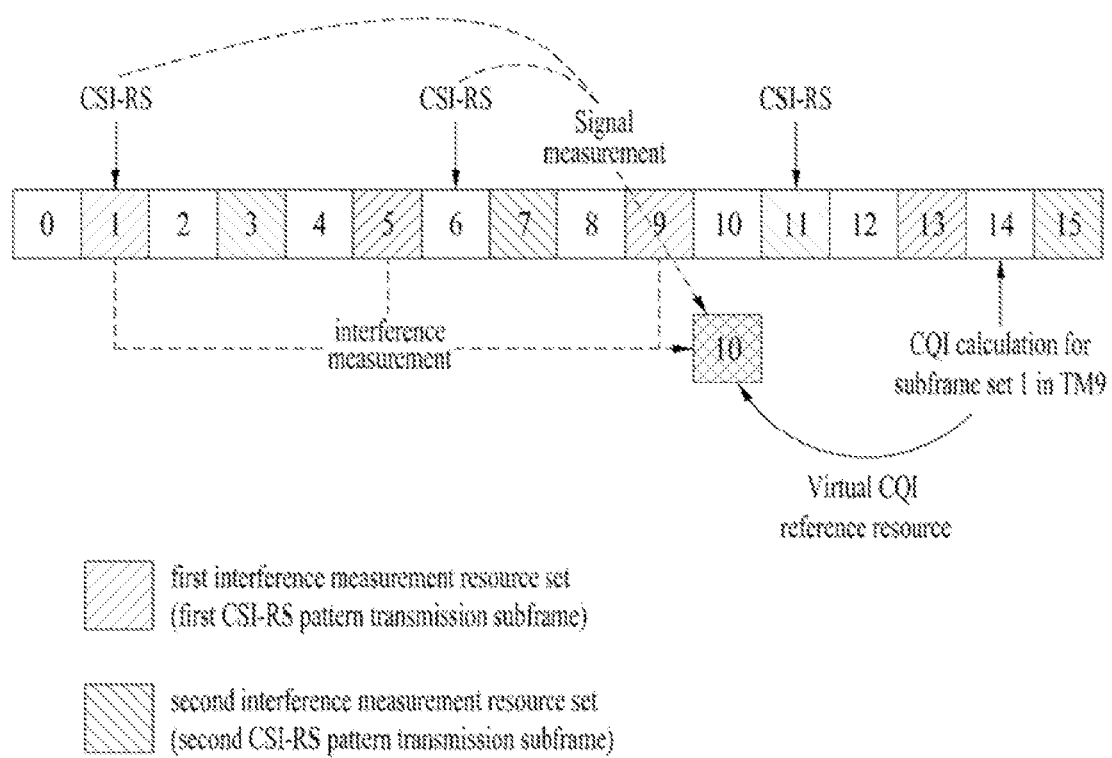
FIG. 9 illustrates exemplary CQI calculation using a virtual CQI reference resource.

FIG. 9 illustrates an example of calculating a CQI using the virtual CQI reference resource. The example of FIG. 9 is based on the assumption that the interference measurement resource is set to a CSI-RS pattern.

The eNB signals two CSI-RS patterns to the UE and instruct the UE to respectively use the CSI-RS patterns as interference measurement resource sets. It is assumed that the transmission period and offset of the first CSI-RS pattern correspond to those of a first interference measurement resource set shown in FIG. 9 and the transmission period and offset of the second CSI-RS pattern correspond to those of a second interference measurement resource set shown in FIG. 9. For example, when the UE reports a CQI in subframe 14, subframe 10 can be set to the virtual CQI reference resource.

Signal characteristics in the virtual CQI reference resource can be measured from CSI-RS patterns other than the CSI-RS patterns set to the interference measurement resource sets. For example, a CSI-RS pattern used for signal measurement can correspond to a CSI-RS configuration set to non-zero transmit power. In the example of FIG. 9, signal characteristics can be measured from a CSI-RS transmitted at intervals of 5 ms (i.e. 5 subframes) starting at subframe 1 and signal characteristics in the virtual CQI reference resource can be determined based on signal characteristics measured through CSI-RSs (i.e. subframes 1 and 6) prior to the virtual CQI reference resource (i.e. subframe 10).

Interference characteristics in the virtual CQI reference resource may be performed in an interference measurement resource set. For example, when the interference measurement resource set is configured as a CSI-RS pattern, a CSI-RS pattern used for an interference measurement resource may correspond to a CSI-RS configuration set to zero transmit power. In the example of FIG. 9, interference can be measured through a CSI-RS pattern (i.e. the first CSI-RS pattern) including subframe 9 that is a subframe corresponding to an interference measurement resource set prior to and closest to the virtual CQI reference resource (subframe 10) between the first and second interference measurement resource sets and interference characteristics in the virtual CQI reference resource can be determined based on the measurement result. That is, an interference measurement resource set may mean REs that represent interference characteristics in a subframe corresponding to the virtual CQI reference resource.

The UE can calculate appropriate CSI and report the CSI in subframe 14 based on the signal characteristics and interference characteristics in the virtual CQI reference resource, determined as above.

EMBODIMENT 5

The present embodiment relates to a method of signaling the interference measurement resource to the UE. Embodiment 5 can signal the interference measurement resource to the UE in a manner similar to the method of signaling an interference measurement subframe set to the UE, described in embodiment 3. The present embodiment describes a case in which the interference measurement resource is configured on an RE or RE set basis.

In the case of periodic CSI reporting, the eNB can directly indicate an interference measurement resource (i.e. an RE set to be used for interference measurement (e.g. CSI-RS pattern)) to be used for a specific CSI report through higher layer signaling (e.g. radio resource control (RRC) signaling).

In the case of aperiodic CSI reporting, a direct indication scheme and an indirect indication scheme can be defined. When direct indication is used, an indicator indicating an interference measurement resource set to be used for CSI reporting can be included in a PDCCH and the UE can detect an interference measurement resource by decoding the PDCCH and measure interference in the interference measurement resource. In the case of indirect indication, a subframe in which a CSI reporting triggering message is transmitted or a subframe, which belongs to and is closest to one of interference measurement resource sets configured for the UE, is determined from among subframes prior to the CSI reporting triggering message transmission subframe and the UE can measure interference in a subframe set including the determined subframe. In addition, the UE can determine interference characteristics in the virtual CQI reference resource on the basis of the interference characteristics measured in the interference measurement resource indicated according to the above-described direct/indirect indication scheme.

When an interference measurement resource set is set to a subframe prior to and closest to the CSI reporting triggering message transmission subframe according to the indirect indication scheme, the position of the virtual CQI reference resource in the time domain may be set to the position of the interference measurement resource. In this case, interference characteristics measured in the interference measurement resource can be used as interference characteristics in the virtual CQI reference resource in CQI calculation.

The UE may use an interference measurement resource set present in the subframe in which the CSI reporting triggering message is transmitted at all times. The eNB may transmit an aperiodic CSI reporting triggering message only in a subframe including an interference measurement resource set. Accordingly, operations of the UE and the eNB can be implemented more easily. In this case, the UE may drop a CSI report when the interference measurement resource set is not present in the subframe in which the CSI reporting triggering message is transmitted. Furthermore, interference characteristics measured in an interference measurement resource set corresponding to a set of some REs of a subframe may be considered as representing interference characteristics in all REs of the subframe and the subframe may be determined as the virtual CQI reference resource. That is, the interference measurement resource can correspond to REs representing interference characteristics in a subframe to which the interference measurement resource belongs.

Two or more different interference measurement resource sets may be configured per subframe. It is desirable that no signal is transmitted from the serving cell in the interference measurement resource. However, an RE carrying no signal from the serving cell is not defined for a UE operating in a legacy system (e.g. LTE system). Accordingly, it is preferable to minimize the number of subframes set to interference measurement resource sets in order to minimize the influence on operation of the legacy UE and thus configuration of two or more interference measurement resource sets per subframe may be considered.

For example, if an interference measurement resource set is configured as a CSI-RS pattern, two CSI-RS patterns (i.e. interference measurement resource sets) can be set within a subframe and used to respectively measure interferences in different communication states. In this case, when the virtual CQI reference resource is determined or an RE set representing interference characteristics in a corresponding subframe is selected, a reference CSI-RS pattern (i.e. interference measurement resource set) may be uncertain. To solve this, the eNB may additionally signal a separate subframe pattern (e.g. CSI measurement subframe set) to the UE and indicate a subframe whose interference characteristics are represented by interference characteristics of each CSI-RS pattern (i.e. interference measurement resource set). For example, the eNB can signal a first subframe pattern indicating an interference measurement resource set pattern and a second subframe pattern indicating a CSI measurement subframe pattern corresponding to the interference measurement resource set pattern to the UE. The first subframe pattern is composed of subframes in which interference measurement resources are transmitted and indicates that the UE may measure interference in a subframe (i.e. interference measurement resource) belonging thereto. The second subframe pattern can indicate a subframe whose interference characteristics are represented by interference characteristics measured in the corresponding interference resource. When plural interference measurement resources are set, the first and second subframe patterns may be signaled for each interference measurement resource set (e.g. CSI-RS pattern). Accordingly, the eNB and the UE can determine a subframe corresponding to interference characteristics represented by measured interference characteristics for each interference measurement resource set (e.g. CSI-RS pattern), which means that the subframe is determined as the virtual CQI reference resource.

Two or more interference measurement resource sets can be configured per subframe as described above. However, to simplify implementation of operations of the eNB and UE without using this scheme, the number of interference measurement resource sets may be restricted such that two or more interference measurement resource sets are not simultaneously present in one subframe. In this case, an interference measurement resource to be used in each virtual CQI reference resource can be indicated according to the above-described direct/indirect indication schemes since only one interference measurement resource set is present in each subframe.

As described above in various embodiments of the present invention, the UE can set a virtual CQI reference resource, determine signal characteristics and interference characteristics in the virtual CQI reference resource from a separate resource (resource that belongs to the virtual CQI reference resource or not), calculate CSI based on the determined signal characteristics and interference characteristics and report the CSI to the eNB. Upon reception of the CSI report about the virtual CQI reference resource, the eNB can transmit a downlink signal to the UE using the CSI reported by the UE in a subframe corresponding to the same channel and interference environment as the virtual CQI reference resource.

Figure 10:
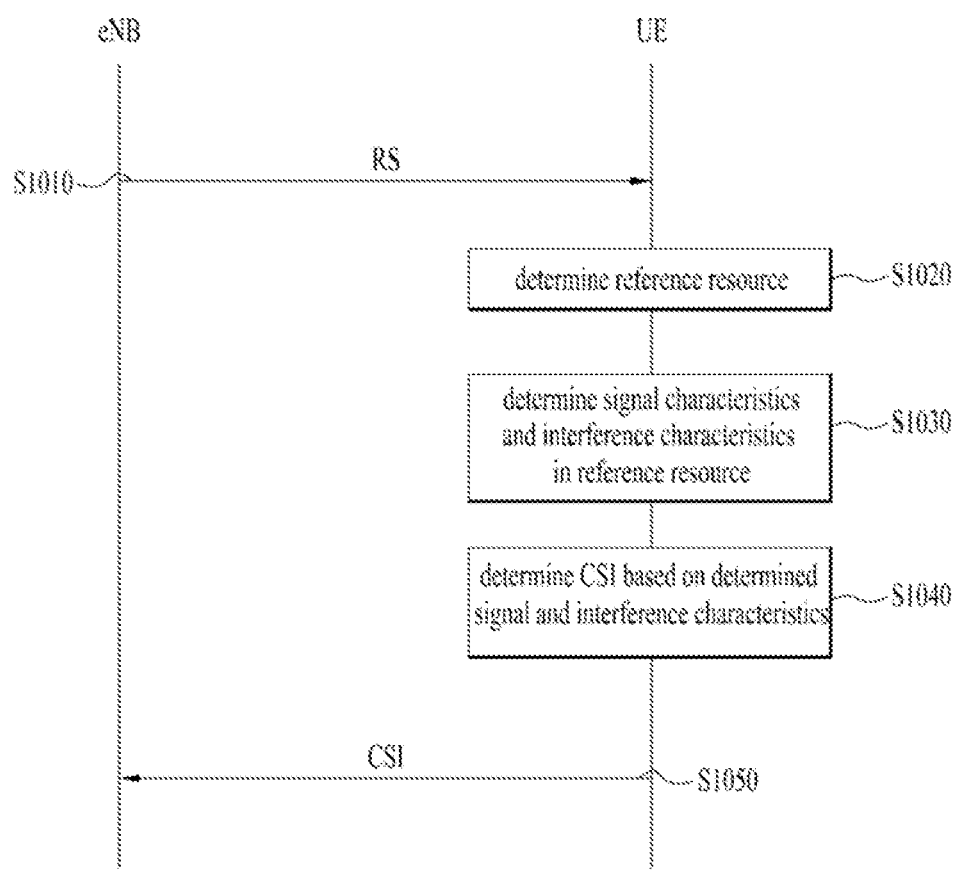
FIG. 10 is a flowchart illustrating a CSI transmission/reception method according to an embodiment of the present invention.

FIG. 10 is a flowchart illustrating a method of transmitting/receiving CSI according to an embodiment of the present invention.

A BS may transmit a reference signal RS to a UE in step S1010. The reference signal may be a CRS and/or a CSI-RS. The CRS may be transmitted in each subframe and the CSI-RS may be transmitted with predetermined periodicity with a predetermined offset.

The UE may determine a reference resource for CSI calculation in step S1020. The reference resource may correspond to a virtual CQI reference resource described in the above embodiments of the present invention. The reference resource may be set to a subframe n–k prior to a subframe n (S1050) in which CSI is transmitted. For example, k is a minimum value greater than 4. That is, the reference resource can be set to a subframe closest to the subframe n from among subframes 4 subframes in advance of the subframe n in which the CSI is transmitted. The subframe n–k set to the reference resource may include a valid downlink subframe or an invalid downlink subframe.

The UE may determine signal characteristics and interference characteristics in the reference resource in step S1030. The signal characteristics may be determined from the reference signal received in step S1010. The reference signal corresponds to the reference resource or a previously received reference signal. The signal characteristics in the reference resource can be determined by using or processing signal characteristics measured using the reference signal. The interference characteristics are determined based on a result of interference measurement in an interference measurement resource configured for the UE. The interference measurement resource may be set to the reference resource or a previous subframe. Interference characteristics measured in the interference measurement resource may be determined as the interference characteristics in the reference resource or processed to determine the interference characteristics in the reference resource. Here, the interference measurement resource may be defined for each of periodic CSI transmission and aperiodic CSI transmission. In the case of aperiodic CSI transmission, the interference measurement resource may be set directly or indirectly. The interference measurement resource may be configured on an RE basis or an RE set basis. For example, the interference measurement resource can be set to REs having transmit power of 0. The interference measurement resource may be set as a CSI-RS pattern. Otherwise, plural interference measurement resources may be set in a subframe.

The eNB may transmit information about reference resource configuration, interference measurement resource configuration, etc. to the UE (not shown) before step S1120 or in step S1010.

The UE may calculate/determine CSI to be reported on the basis of the signal characteristics and interference characteristics determined for the reference resource in step S1040.

The UE may transmit the calculated/determined CSI to the eNB in step S1050.

The above-described embodiments of the present invention may be applied independently or in a combined manner to the method of transmitting/receiving CSI described with reference to FIG. 10 and descriptions of redundant parts are omitted for clarity.

Figure 11:
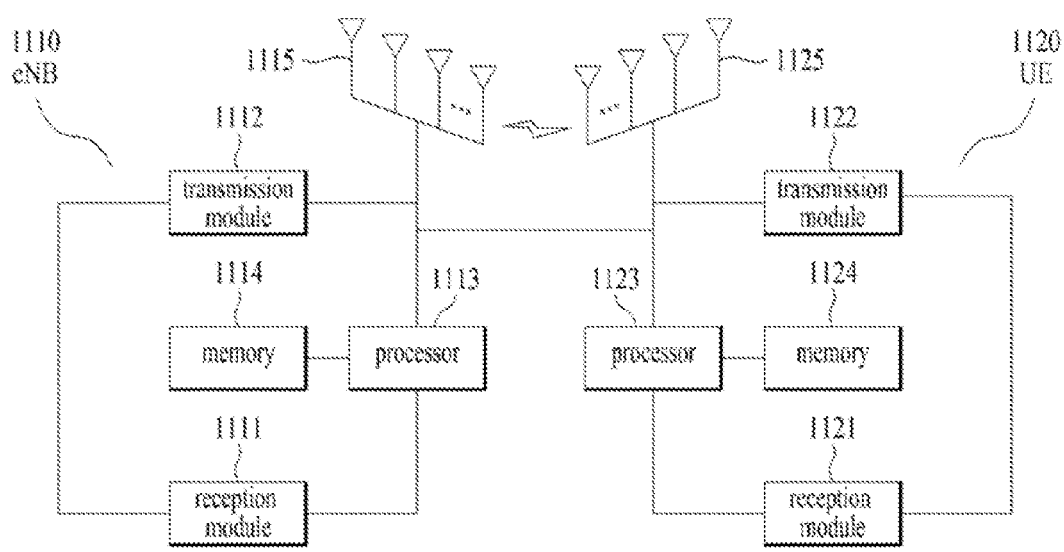
FIG. 11 illustrates a base station (BS) and a user equipment (UE) according to an embodiment of the present invention.

FIG. 11 illustrates configurations of an eNB and a UE.

Referring to FIG. 11, an eNB 1110 according to an embodiment of the present invention may include a reception module 1111, a transmission module 1112, a processor 1113, a memory 1114 and a plurality of antennas 1115. The plurality of antennas 1115 represents that the eNB supports MIMO transmission and reception. The reception module 1111 may receive various signals, data and information on uplink from the UE. The transmission module 1112 may transmit various signals, data and information on downlink to the UE. The processor 1113 may control overall operation of the eNB 1110.

The eNB 1110 according to an embodiment of the present invention may be configured to receive CSI. The processor 1113 of the eNB 1110 may be configured to transmit a reference signal to the UE 1120 through the transmission module 1112. Furthermore, the processor 1113 may be configured to receive CSI from the UE 1120 in a subframe n through the reception module 1111. Here, the CSI may be determined based on signal characteristics and interference characteristics in a reference resource present in a subframe n−k (k≥4). The signal characteristics in the reference resource may be determined from a signal measurement result through the reference resource or a previously received reference signal. The interference characteristics in the reference resource may be determined from a result of interference measurement in the reference resource or a previously configured interference measurement resource.

In addition, the processor 1113 of the eNB 1110 may process information received by the eNB 1110 and information to be transmitted from the eNB 1110. The memory 1114 may store the processed information for a predetermined time and may be replaced by a component such as a buffer (not shown).

Referring to FIG. 11, the UE 1120 according to an embodiment of the present invention may include a reception module 1121, a transmission module 1122, a processor 1123, a memory 1124 and a plurality of antennas 1125. If the UE includes the plurality of antennas 1125, this indicates support for MIMO transmission and reception. The reception module 1121 may receive various signals, data and information on downlink from the eNB. The transmission module 1122 may transmit various signals, data and information on uplink to the eNB. The processor 1123 may control the overall operation of the UE 1120.

The UE 1120 according to an embodiment of the present invention may be configured to transmit CSI. The processor 1123 of the UE 1120 may be configured to determine a reference resource for CSI calculation and signal characteristics and interference characteristics in the reference resource. The processor 1123 may be configured to determine CSI using the signal characteristics and interference characteristics and transmit the determined CSI to the eNB 1110 in subframe n through the transmission module 1122. The reference resource may be present in subframe n−k (k≥4). The signal characteristics in the reference resource may be determined from a signal measurement result through the reference resource or a previously received reference signal. The interference characteristics in the reference resource may be determined from a result of interference measurement in the reference resource or a previously configured interference measurement resource.

In addition, the processor 1123 of the UE 1120 may process information received by the UE 1120 and information to be transmitted from the UE 1120. The memory 1124 may store the processed information for a predetermined time and may be replaced by a component such as a buffer (not shown).

The eNB and UE may be implemented such that the above-described embodiments of the invention can be independently applied thereto or two or more of the embodiments can be simultaneously applied thereto and descriptions of redundant parts are omitted for clarity.

The description of the eNB 1110 may be equally applied to a relay as a downlink transmitter or an uplink receiver and the description of the UE 1120 may be equally applied to a relay as a downlink receiver or an uplink transmitter.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described embodiments of the present invention can be applied to various mobile communication systems.

The invention claimed is:

1. A method for transmitting channel status information (CSI) by a User Equipment (UE) in a wireless communication system, comprising:
   determining signal characteristics and interference characteristics in a virtual reference resource for calculation of the CSI;
   determining the CSI using the determined signal characteristics and interference characteristics; and
   transmitting the CSI in a subframe n to an eNodeB (eNB),
   wherein the virtual reference resource is present in a subframe n−k (k≥4),
   wherein the determining signal characteristics includes determining whether the subframe n−k to which the virtual reference resource is set includes a valid downlink subframe or an invalid downlink subframe,
   wherein the signal characteristics are determined from a signal measurement result through the virtual reference resource when the subframe n−k is determined to be the valid downlink subframe or an average of measurement results of previously received reference signals when the subframe n−k is determined to be the invalid downlink subframe, wherein the interference characteristics are determined from a result of interference measurement in the virtual reference resource when the subframe n−k is determined to be the valid downlink subframe or an average of measurement results of previously set interference measurement resources when the subframe n−k is determined to be the invalid downlink subframe, and wherein the valid downlink subframe is set for the UE, is not multicast or broadcast over a single frequency network (MBSFN) subframe in transmission modes other than a transmission mode for downlink transmission of a maximum of 8 layers, does not include a downlink pilot time slot (DwPTS) field less than a predetermined length, and does not belong to a measurement gap set for the UE.

2. The method according to claim 1, wherein the reference signals upon which signal measurements are performed correspond to a CSI-RS in the case of downlink transmission of up to 8 layers and corresponds to a cell-specific RS in other cases.

3. The method according to claim 1, wherein, when the CSI is periodically transmitted, the interference measurement resources are set by a higher layer signal.

4. The method according to claim 1, wherein, when the CSI is aperiodically transmitted, the interference measurement resources are set by a predetermined indicator, the predetermined indicator being included in downlink control information including an indicator requesting transmission of the CSI.

5. The method according to claim 1, wherein, when an interference measurement resource subframe set is configured for the UE and the CSI is aperiodically transmitted, the interference measurement resources are included in a subframe belonging to the interference measurement resource subframe set configured for the UE and having a value k corresponding to a minimum value, from among a subframe in which the indicator requesting transmission of the CSI is transmitted and previous subframes.

6. The method according to claim 1, wherein, when the CSI is aperiodically transmitted, the subframe in which the indicator requesting transmission of the CSI is transmitted corresponds to a subframe set to the interference measurement resources.

7. The method according to claim 1, wherein the reference measurement resources include one or more resource elements (REs) having zero transmit power.

8. The method according to claim 1, wherein the interference measurement resources are set to CSI-RS REs.

9. The method according to claim 1, wherein plural interference measurement resource sets are configured in a subframe for the UE, and wherein a subframe set in which the interference measurement resources are present and a subframe set to which interference characteristics represented by the interference measurement resource are applied are separately set for each of the plural interference measurement resource sets.

10. The method according to claim 1, wherein the result of interference measurement in the interference measurement resources represents interference characteristics in a subframe corresponding to the virtual reference resource.

11. A user equipment (UE) configured to transmit CSI in a wireless communication system, comprising:

a receiver configured to receive a downlink signal from an eNB;

a transmitter configured to transmit an uplink signal to the eNB; and a processor configured to control the UE including the receiver and the transmitter, wherein the processor is configured to determine signal characteristics and interference characteristics in a virtual reference resource for calculation of the CSI, to determine the CSI using the determined signal characteristics and interference characteristics, and to transmit the CSI to the eNodeB (eNB) in a subframe n via the transmitter, wherein the virtual reference resource is present in a subframe n−k (k≥4), wherein the processor is further configured to determine whether the subframe n−k to which the virtual reference resource is set includes a valid downlink subframe or an invalid downlink subframe, wherein the signal characteristics are determined from a signal measurement result through the reference resource when the subframe n−k is determined to be the valid downlink subframe or an average of measurement results of previously received reference signals when the subframe n−k is determined to be the invalid downlink subframe, wherein the interference characteristics are determined from a result of interference measurement in the virtual reference resource when the subframe n−k is determined to be the valid downlink subframe or an average of measurement results of previously set interference measurement when the subframe n−k is determined to be the invalid downlink subframe, and wherein the valid downlink subframe is set for the UE, is not multicast or broadcast over a single frequency network (MBSFN) subframe in transmission modes other than a transmission mode for downlink transmission of a maximum of 8 layers, does not include a downlink pilot time slot (DwPTS) field less than a predetermined length, and does not belong to a measurement gap set for the UE.

* * * * *